United States Patent [19]

Schindler

[11] 4,181,440
[45] Jan. 1, 1980

[54] OVER-UNDER DOUBLE-PASS INTERFEROMETER

[76] Inventor: Robert A. Frosch, Administrator of the National Aeronautics and Space Administration, with respect to an invention of Rudolf A. Schindler, Sierra Madre, Calif.

[21] Appl. No.: 858,596

[22] Filed: Dec. 8, 1977

[51] Int. Cl.² ............................................. G01B 9/02
[52] U.S. Cl. .................................................. 356/346
[58] Field of Search ................. 356/106 R, 106 S, 346

[56] References Cited

U.S. PATENT DOCUMENTS

| | | | |
|---|---|---|---|
| 3,809,481 | 5/1974 | Schindler | 356/106 S |
| 3,976,379 | 8/1976 | Morokuma | 356/106 R |

*Primary Examiner*—John K. Corbin
*Assistant Examiner*—Matthew W. Koren

*Attorney, Agent, or Firm*—Monte F. Mott; John R. Manning; Wilfred Grifka

[57] ABSTRACT

An over-under double-pass interferometer in which the beamsplitter area and thickness can be reduced to conform only with optical flatness considerations is achieved by offsetting the optical center line of one cat's-eye retroreflector relative to the optical center line of the other in order that one split beam be folded into a plane distinct from the other folded split beam. The beamsplitter is made transparent in one area for a first folded beam to be passed to a mirror for doubling back and is made totally reflective in another area for the second folded beam to be reflected to a mirror for doubling back. The two beams thus doubled back are combined in the central, beam-splitting area of the beamsplitter and passed to a detector. This makes the beamsplitter insensitive to minimum-thickness requirements and selection of material.

9 Claims, 6 Drawing Figures

4,181,440

OVER-UNDER DOUBLE-PASS INTERFEROMETER

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

This invention relates to interferometers, and more particularly to interferometers utilizing double-pass retroreflectors.

In a Fourier interference spectrometer of the double-pass "cat's-eye" retroreflector type, a single mirror is employed in the path of both split beams of an incoming ray to cause them to double back through separate retroreflectors, as shown in U.S. Pat. No. 3,809,481 by the same inventor. Changes in optical path length are achieved by linear displacement of both retroreflectors using a motor-driven lead screw on one for large, low-frequency changes, a moving-coil actuator on the other for smaller, mid-frequency changes and a piezoelectric actuator on one of these two for small, high-frequency changes. Alternatively, one of the retroreflectors may be fixed in space while the other is displaced for large, low-frequency changes. The optical axis of the movable retroreflector is then made parallel to the optical axis of the first retroreflector by using a mirror at a 45° angle of incidence. This mirror may then be displaced in a direction normal to its reflecting surface for smaller mid-frequency changes. A piezoelectric actuator on one of the retroreflectors is used for small, high-frequency changes as before. In either case, a "cubic" beamsplitter must be fabricated with precision to form two plane mirrors on the outside normal to the incident retroreflected beams, or a beamsplitter according to the aforesaid U.S. patent must be employed. However, even a "thick" beam splitter according to that invention involves a cost significantly greater than if a "thin" beamsplitter were used. Therefore, an object of this invention is to provide an arrangement for an interferometer utilizing double-pass retroreflectors that will permit using a beamsplitter reduced in thickness to conform only with considerations of optical flatness.

SUMMARY OF THE INVENTION

In accordance with this invention, the spatial reflection orientation of retroreflectors in a double-pass interferometer is so arranged that one retroreflector is in a plane offset from the other retroreflector in order that the double-pass retroreflected beams combine. To accomplish that, the axes of the two double-pass retroreflected output beams coincide in a plane between the single-pass reflected beams of the two retroreflectors. Thus, the input beam, $A_1$, of one retroreflector emerges as a single-pass output beam, $B_1$, offset in one direction. Upon being reflected for the second pass, the beam emerges from the one retroreflector on the axis of the input beam, $A_1$. The input beam $A_2$ of the other retroreflector emerges as a single pass output beam $B_2$ offset in a direction opposite the one direction because the other retroreflector is oppositely offset. Upon being reflected for the second pass, the beam emerges from the other retroreflector on the axis of the input beam $A_2$. The beamsplitter need only split the original beam from the source into the beams $A_1$ and $A_2$ with virtually the same axis, so that the emerging double-pass beams can recombine. Consequently, the beamsplitter thickness can be reduced to conform only with optical flatness.

The novel features that are considered characteristic of this invention are set forth with particularly in the appended claims. The invention will best be understood from the following description when read in connection with the accompanying drawings.

DESCRIPTION OF PREFERRED EMBODIMENTS

Figure 1:
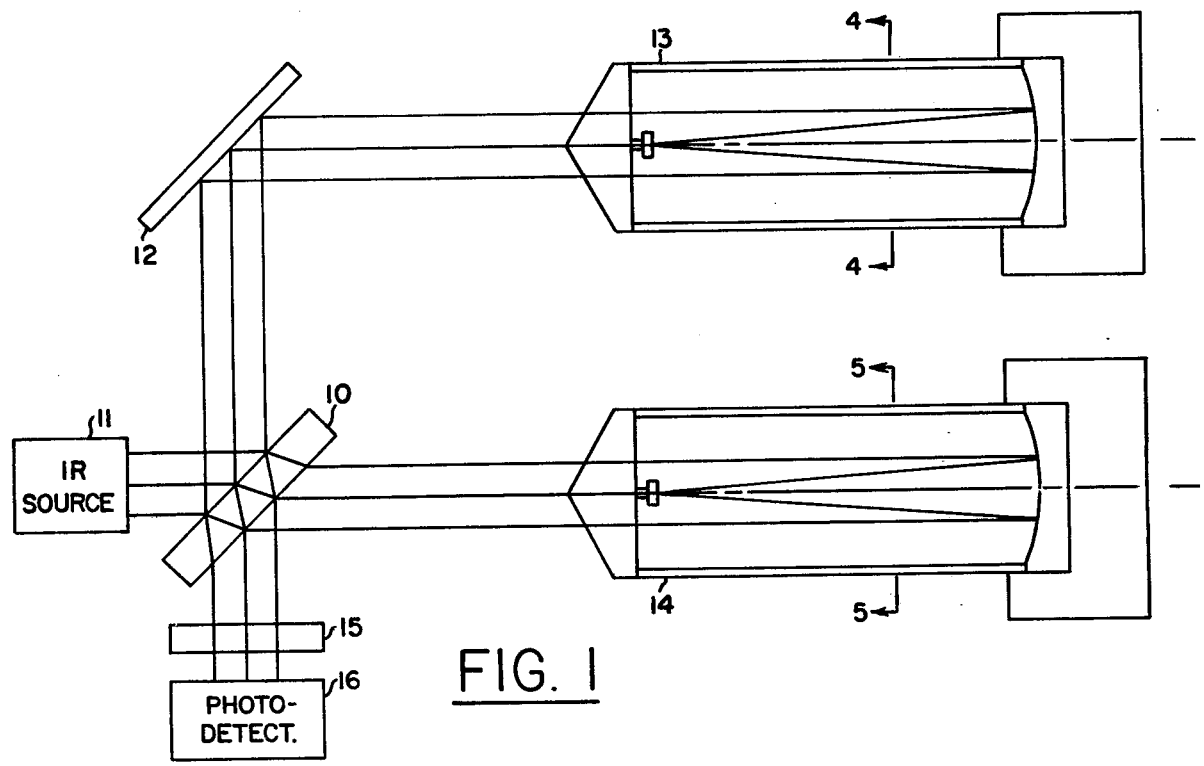
FIG. 1 is a plan view of the optical configuration of an over-under double-pass interferometer embodying the present invention.

Referring now to the drawings, a plan view is shown schematically in FIG. 1 of a high-speed double-pass interferometer very similar to that shown in the aforesaid Pat. No. 3,809,481, but with the improvement of a beamsplitter 10 having an area and thickness reduced to conform only with optical flatness considerations. That patent discloses a Fourier interference spectrometer of the double-pass retroreflector type in which a single mirror is employed in the path of both split beams of an incoming beam to cause them to double back through separate retroreflectors. Changes in optical path length are achieved by linear displacement of both retroreflectors using a motor-driven lead screw on one for large, low-frequency changes, a moving-coil actuator on the other for smaller, mid-frequency changes and a piezoelectric actuator on one of these two for small, high-frequency changes. Different arrangements are disclosed for the beamsplitter to function as a splitter for the incoming beam, a "window" for one split beam and a mirror at 45° with the beamsplitter for the other reflecting beam. A problem with that arrangement was that both retroreflected beams were reflected by the same mirror at 45° with the beam splitter so that while one split beam is reflected by a reflective surface on the beamsplitter, the other split beam needed to be displaced so as to pass through the window onto the mirror. That required special design considerations for the beamsplitter beyond just optical flatness. The present invention offsets the axis of one retroreflector from the other so that while both receive split beams in a common plane, one retroreflects in a plane offset in one direction while the other retroreflects in a plane in the opposite direction. An advantage of this is that it reduces cost and improves the latitude of selection of materials for the beamsplitter.

Figure 2:
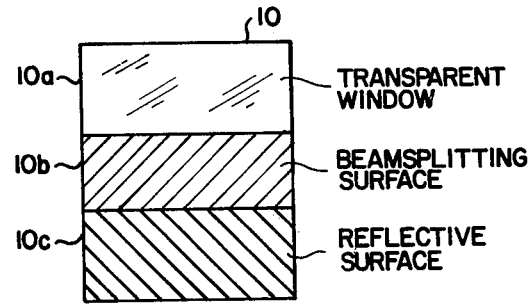
FIG. 2 is a front elevation view of a beamsplitter in the optical configuration of FIG. 1.

A beamsplitter 10 shown in a plan view (i.e., standing on end) is divided into three horizontal areas as shown in an elevation view in FIG. 2, a top area 10a that is clear to provide a transparent window, a central area 10b that is 50% coated to provide an IR beamsplitting surface, and a bottom area to provide a reflective surface. The beam from the source 11 is directed at the beamsplitting surface to provide two beams $A_1$ and $A_2$ illustrated schematically in FIG. 6. The first beam $A_1$ is directed to a mirror 12 which reflects the beam into a cat's-eye retroreflector 13. This "corner" mirror is useful not only to so fold the path of the beam $A_1$ that the retroreflector 13 is disposed adjacent a cat's-eye retroreflector 14, for convenient packaging, but also to provide a way of making small, mid-frequency changes in the path length of the beam $A_1$. However, that is not essential, since the present invention can be practiced in the interferometer arrangement of the aforesaid patent, or with the mirror 12 at some other angle.

Figure 6:
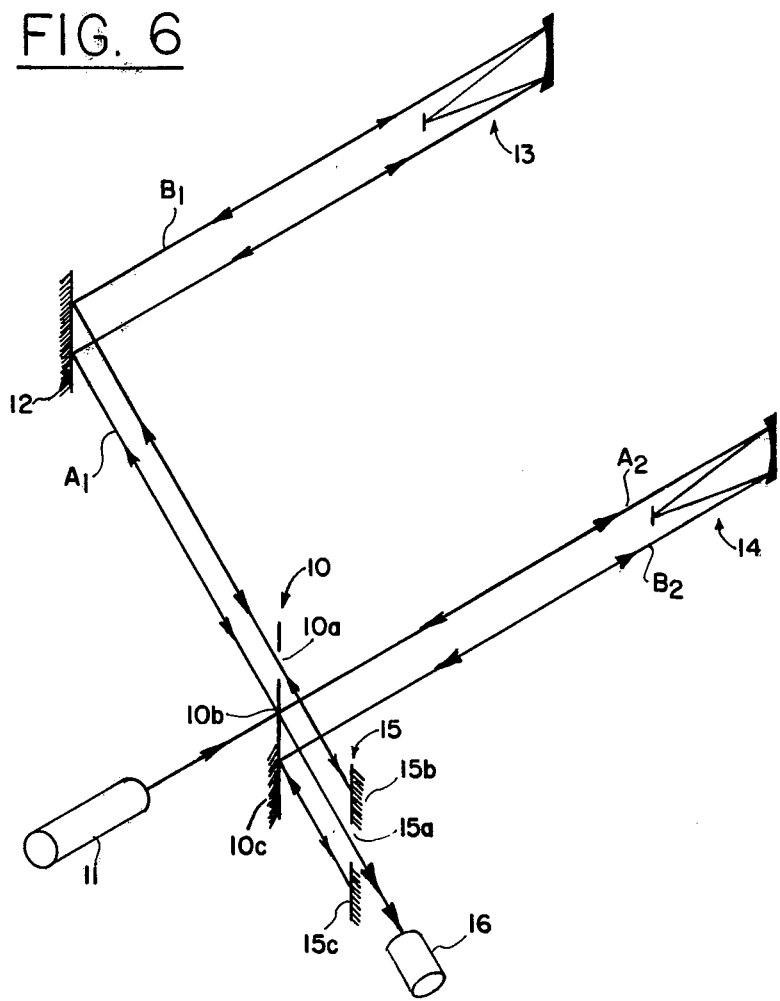
FIG. 6 is an isometric diagram of the over-under double-pass beam paths in the optical configuration of FIG. 1.

The beam $A_1$ enters the retroreflector at one (lower) level, and exits at another (upper) level as a beam $B_1$ in the manner shown in FIG. 6. The beam $B_1$ is reflected by the mirror 12 to the beamsplitter 10 where it passes through the transparent upper area 10a of the beamsplitter onto a mirror 15 which has a reflective coating on an upper area 15b to reflect the beam $B_1$, thereby to cause it to double back through the central area 10b of the beamsplitter and through the transparent central area 15a of the mirror 15. The beam $A_1$ which has thus doubled back is passed to a photodetector 16. That beam is to be combined with the beam $A_2$ similarly doubled back, but instead of doubling back through an optical path over the path for the beam $A_2$, as in the case of the beam $A_1$, that beam doubles back through a path under the path for the beam $A_2$, as shown in FIG. 6.

The beamsplitter 10 shown at a 45° angle for convenience may be placed at some other angle for optical considerations. It transmits 50% of the input beam from the source 11 to the cat's-eye retroreflector 14. That is accomplished by the central area 10b of the beamsplitter as shown in FIG. 2. The retroreflector 14 has its optical axis offset from the optical axis of the retroreflector 13 in a vertical direction, i.e., normal to the plane of the drawing of FIG. 1. This causes the beam $B_2$ to be reflected from the lower area 10c of the beamsplitter 10 shown in FIG. 2, and onto the lower area 15c of the mirror 15. From there it doubles back, emerging from the retroreflector 14 over the path of the beam $A_2$ to impinge the beamsplitter 10 in the central area 10b. There the back side of the beamsplitting surface reflects the beam $A_2$, thereby to combine the beams $A_1$ and $A_2$ passing through the transparent window 15a into the photo detector 16.

Figure 3:
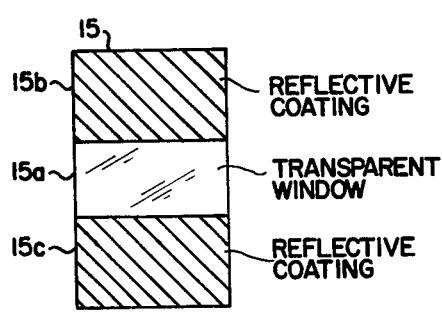
FIG. 3 is a front elevation view of a fixed reflecting mirror used to double back split beams in the optical configuration of FIG. 1, and to pass the combined beams at the output of the interferometer to a photodetector.
Figure 4:
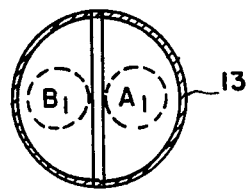
FIG. 4 is a sectional view taken along a line 4—4 in FIG. 1 to show the under and over paths of the retroreflected beam on one side of the beamsplitter.
Figure 5:
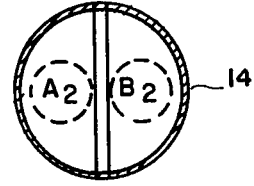
FIG. 5 is a sectional view taken along a line 5—5 in FIG. 1 to show the over and under paths of the retroreflected beam on the other side of the beamsplitter.

This novel arrangement for an over-under double-pass interferometer utilizing a flat thin plate as a beamsplitter is better understood from FIGS. 4 and 5, which are sectional views of the retroreflectors 13 and 14 taken along respective lines 4—4 and 5—5. FIG. 4 shows the split beam $A_1$ at the bottom and the retroreflected beam $B_1$ emerging at the top. The top is shown on the left in FIG. 4 because it is a section taken on a line in the plan view of FIG. 1 looking to the left. Similarly, FIG. 5 shows the split beam $A_2$ at the top and the retroreflected beam $B_2$ emerging at the bottom. This entire arrangement is then fully clarified by the schematic diagram of FIG. 6 referred to hereinbefore wherein all of the elements referred to in FIGS. 1 to 3 are identified by the same reference numerals.

Although a particular embodiment of the invention has been described using vertical reflection orientation in the cat's-eye retroreflectors, such that one retroreflector has its optical center line offset vertically with respect to the optical center line of the other, it is recognized that modifications and equivalents may readily occur to those skilled in the art and consequently it is intended that the claims be interpreted to cover such modifications and equivalents. For example, in place of a transparent area in the mirror 15, there may be a smaller mirror in front at an angle to reflect the combined beam off to one side for detection, or a hole, preferably a circular hole in the mirror 15. In any case the beamsplitter area and thickness can be reduced to conform only with optical flatness considerations which require a ratio of thickness to length of about 1 to 7, or 8. For example, a beamsplitter 4" long would have to be about ¼" thick to assure optical flatness. The beamsplitting surface and reflective surface are on the same face of the plate. Typical materials for the beamsplitter are borium fluoride for wavelengths from visible light to about 11.5 microns and potassium bromide for wavelengths from visible light to about 16 microns.

What is claimed is:

1. In an interference spectrometer of the double-pass type having a light detector for detecting interference fringes produced by recombined light beams passing through different optical paths from a single source, each optical path having a retroreflector for directing a beam from a beam splitter to a plane mirror via the beamsplitter, and from said mirror back to the beamsplitter for recombination, an improvement comprising the orientation of one retroreflector to offset its path to said plane mirror from the path of the other retroreflector in order that the path of one beam through a retroreflector be folded into a plane on one side of a plane defined by the recombined beams, and the path of the other beam through a retroreflector be folded into a plane on the other side of said plane defined by the recombined beams, whereby the beamsplitter area and thickness can be reduced to conform only with optical flatness considerations.

2. The improvement defined in claim 1 wherein said beamsplitter has a beamsplitting surface in a central area, a transparent surface in one end area in the path of said one beam through a retroreflector to pass said one beam to said detector, and a reflective surface in an end area opposite said one end area in the path of said other beam through a retroreflector to pass said other beam to said detector.

3. In an interferometer of the double-pass type having a beamsplitter for splitting a beam of light from a source into two separate beams, and having a separate retroreflector for each split beam for returning a reflected beam from a stationary reflecting surface back past the beamsplitter where the two beams are combined, and having means for detecting the combined beams, the improvement comprising offsetting the optical center line of one retroreflector relative to the optical center line of the other in order that one split beam be folded into a plane distinct from the other split beam, said beamsplitter having one area having a beamsplitter surface, one area that is transparent for one split beam reflected from said beamsplitter to be passed from a retroreflector to said stationary reflecting surface for doubling the one beam back on itself through the beamsplitting area, and one area that has a reflecting surface for the other split beam transmitted through said beam splitter to be reflected from a retroreflector to said stationary reflecting surface for doubling the other beam back on itself through the beamsplitting area, whereby the beamsplitter area and thickness can be reduced to conform only with optical flatness considerations.

4. The improvement defined by claim 3 wherein said beamsplitter is comprised of a plate of material transparent to said beam from said source with a 50 percent reflective coating on one central region, 100 percent reflective coating on one region to one side of said central region, and a clear region on the opposite side of said central region, and said retroreflectors are oriented for the 100 percent reflective coating region to be used for double pass of one split beam and the clear region to be used for double pass of the other split beam, and said central region is used to split and recombine said split beams.

5. In an over-under double-pass interferometer, an optical configuration which allows a single flat plate to be used for a beamsplitter reduced in thickness to conform only with considerations of optical flatness comprising two retroreflectors with their spatial reflection orientation arranged so that one retroreflector is in a plane offset from the other retroreflector in order that the double-pass retroreflected beams combine at said beamsplitter with the axes of the two double-pass retroreflected output beams coincident at the beamsplitter in a plane between the single-pass reflected beams of the two retroreflectors.

6. The combination of claim 5 wherein one split beam is retroreflected above its single-pass reflected beam and the other split beam is retroreflected below its single-pass reflected beam, and the two retroreflected beams combine at the beamsplitter.

7. The combination of claim 6 wherein said beamsplitter is comprised of a plate of material transparent to said beam from said source with a 50 percent reflective coating on one central region, 100 percent reflective coating on one region to one side of said central region, and a clear region on the opposite side of said central region, and said retroreflectors are oriented for the 100 percent reflective coating region to be used for double pass of one split beam and the clear region to be used for double pass of the other split beam, and said central region is used to split and recombine said split beams.

8. In an interferometer utilizing two double-pass retroreflectors and a fixed mirror, the improvement comprising a flat-plate beamsplitter at an angle to a beam from a source of light, said beamsplitter having a face receiving said light, said face having a beamsplitting surface coating in a central region to split light from said source into two beams, no coating on one side of said central region to provide a clear surface, and a reflective coating on the opposite side of said central region to provide a reflective surface, one beam being directed by reflection from said beam splitting surface to one retroreflector, and the other beam being directed by transmission through said beam splitting surface to the other retroreflector, said one retroreflector being oriented to fold said one beam back to said window of said beamsplitter for transmission to said fixed mirror for doubling said one beam back to said central region, and said other retroreflector being oriented to fold said other beam back to said reflective coating of said beamsplitter for reflection to said fixed mirror for doubling said one beam back to said central region for combining with said other beam doubled back to said central region, and means for detecting the beams as combined in said central region.

9. The improvement of claim 8 wherein said fixed mirror is a plate having reflective coatings on both sides of a clear region to provide a transparent window for transmission of said beams as combined, and said means for detecting the beams as combined is positioned to receive light transmitted through said window.

* * * * *